(12) United States Patent
Kroll et al.

(10) Patent No.: US 6,582,278 B1
(45) Date of Patent: Jun. 24, 2003

(54) MACHINE TOOL WITH HORIZONTAL WORK SPINDLE

(76) Inventors: Dieter Kroll, Talstrasse 21, D-35466 Rabenau (DE); Wolfgang Armleder, Turmweg 3, D-78628 Rottweil (DE)

( * ) Notice: Subject to any disclaimer, the term of this patent is extended or adjusted under 35 U.S.C. 154(b) by 0 days.

(21) Appl. No.: 09/857,764

(22) PCT Filed: Dec. 3, 1999

(86) PCT No.: PCT/DE99/03871
§ 371 (c)(1),
(2), (4) Date: Aug. 31, 2001

(87) PCT Pub. No.: WO00/34003
PCT Pub. Date: Jun. 15, 2000

(51) Int. Cl.[7] .............................................. B24B 49/00
(52) U.S. Cl. ........................... 451/9; 451/127; 451/143
(58) Field of Search ................................ 451/9, 10, 11, 451/124, 127, 140, 143, 242, 246; 125/30

(56) References Cited

U.S. PATENT DOCUMENTS

| | | | |
|---|---|---|---|
| 3,817,650 A | | 6/1974 | Reich et al. |
| 4,712,282 A | | 12/1987 | Romeu |
| 5,183,374 A | | 2/1993 | Line |
| 5,452,502 A | | 9/1995 | Walter et al. |
| 5,484,323 A | * | 1/1996 | Smith ........................... 451/10 |
| 6,224,462 B1 | * | 5/2001 | Yokoyama et al. ........... 451/10 |

FOREIGN PATENT DOCUMENTS

| | | |
|---|---|---|
| DE | 19639527 | 4/1998 |
| EP | 0015372 | 1/1980 |
| EP | 0845325 | 12/1996 |
| EP | 0816012 | 6/1997 |
| SU | 1380915 | 3/1988 |
| SU | 2139174 | 3/1988 |
| WO | 9005053 | 9/1990 |
| WO | 9727024 | 7/1997 |
| WO | 9813170 | 4/1998 |
| WO | 9819819 | 5/1998 |
| WO | 9857777 | 12/1998 |

* cited by examiner

Primary Examiner—Eileen P. Morgan

(57) ABSTRACT

In a machine tool for cutting treatment of workpieces, comprising a workpiece support having two opposing side walls, a tool support having two opposing side walls and at least one approximately horizontally disposed processing unit (work spindle 8) on the tool support, wherein during operation of the machine tool, forces act between workpiece and processing unit, in particular in the Z direction, the side walls of the tool support and workpiece support, respectively, are combined to form one common side wall (3). Since tool and also workpiece are held at the two common side walls, the forces acting between tool and workpiece are accommodated by said side walls.

8 Claims, 5 Drawing Sheets

MACHINE TOOL WITH HORIZONTAL WORK SPINDLE

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to a machine tool for cutting treatment of workpieces, and, in particular, a machine tool comprising a workpiece support having two opposing side walls, a tool support having two opposing side walls and at least one approximately horizontally disposed processing unit on the tool support, wherein during operation of the machine tool, forces act between the workpiece and the processing unit, in particular in the Z direction.

A machine tool of this type is disclosed e.g. in DE 196 39 527 C1 (corresponding to WO9813170), entitled "Machine Tool For Cutting Processes With A Horizontally Lodged Work Spindle".

This known machine tool comprises a vertical frame-like tool support on a common machine base, having an upper horizontal transverse support and, parallel opposite thereto, a vertical frame-like workpiece support having an upper horizontal transverse support. These upper transverse supports which have approximately the same height are connected via one or more connecting supports to form a stable unit such that displacement between the workpiece side and the tool side which could occur in the Z direction due to e.g. high acceleration and processing forces, is diverted via the connecting support(s).

The known connecting support has the shape of a fork and is mounted with one leg to the upper transverse support of the workpiece support while the ends of the two fork-shaped legs are mounted to the transverse support of the tool support, being supported on same. Depending on the spatial conditions and the production requirements, the connecting support is mounted at the center, out-of-center, or at an end of the transverse support. This connecting support requires additional production and manufacturing effort since it has to be produced separately as special part.

SUMMARY OF THE INVENTION

It is the object of the invention to further develop a machine tool of the above mentioned type such that displacements between workpiece side and tool side can be effectively prevented without specially produced parts.

This object is achieved in accordance with the invention in that the side walls of the tool support and workpiece support, respectively, are combined into a common side wall.

The advantage achieved with the invention is in that the forces acting between the tool and workpiece are accommodated by the side walls since the tool and also the workpiece are held at these two common side walls. Acceleration and processing forces, in particular in the Z direction, occur if the workpiece and processing unit are movable relative to one another in this direction and moreover the side walls can be used advantageously as lateral protective walls against cuttings etc.

In preferred embodiments of the invention one approximately vertical guide is provided on each of the two common side walls for a Y slide of the processing unit (e.g. one or more work spindles) which is preferably disposed such that it can be displaced in three dimensions via an X and Z slide.

A second aspect of the invention concerns a machine tool in particular for cutting treatment of workpieces. The machine tool comprises a workpiece support having two opposing side walls, a tool support having two opposing side walls and at least one approximately horizontally disposed processing unit on the tool support, wherein during operation of the machine tool forces act between the workpiece and the processing unit, in particular in the Z direction and wherein an upper transverse support of the tool support and an upper transverse support of the workpiece support are connected to one another in the Z direction.

To achieve the above mentioned object, this machine tool combines the two upper transverse supports into one single common upper transverse support in accordance with the invention.

This upper transverse support which is common to both supports, can also accommodate the forces acting therebetween. In this embodiment, the side walls of the tool support and workpiece support do not necessarily have to be combined into one common side wall but may be separated from one another in the Z direction, e.g. for leaving a set-up opening therebetween. The forces acting between workpiece and tool side and thereby between the individual side walls are diverted to and accommodated by the common transverse support.

Advantageous embodiments of this invention comprise on the common upper transverse support an approximately horizontal guide for an X slide of the processing unit which is preferably disposed such that it can also be moved in three dimensions via a Y and Z slide.

In a further development, the common upper transverse support can have an opening through which a tool exchanger can be lowered onto the level of the processing unit to change its tool.

In a further advantageous embodiment, which may be provided in both aspects of the invention, the tool support and workpiece support have one single common lower transverse support as base. This transverse support may also be provided with an approximately horizontal guide for the X slide of the processing unit.

In a very particular further development of this embodiment, the side walls, the common lower transverse support and the common upper transverse support may be combined into a common frame. This self-contained frame represents at the same time a protective cover for cuttings etc.

The common frame may be manufactured as a one-piece casting or be composed of several interconnected, in particular welded, individual parts.

Further advantages of the invention can be extracted from the description and the drawing. The features mentioned above and below can be used in accordance with the invention either individually or collectively in any arbitrary combination. The embodiments shown and described are not to be understood as an exhaustive enumeration but rather in an exemplary character for describing the invention. The invention is schematically shown in the figures to clearly show the essential features of the invention. The representations are not necessarily to scale.

DESCRIPTION OF THE PREFERRED EMBODIMENTS

Figure 1:
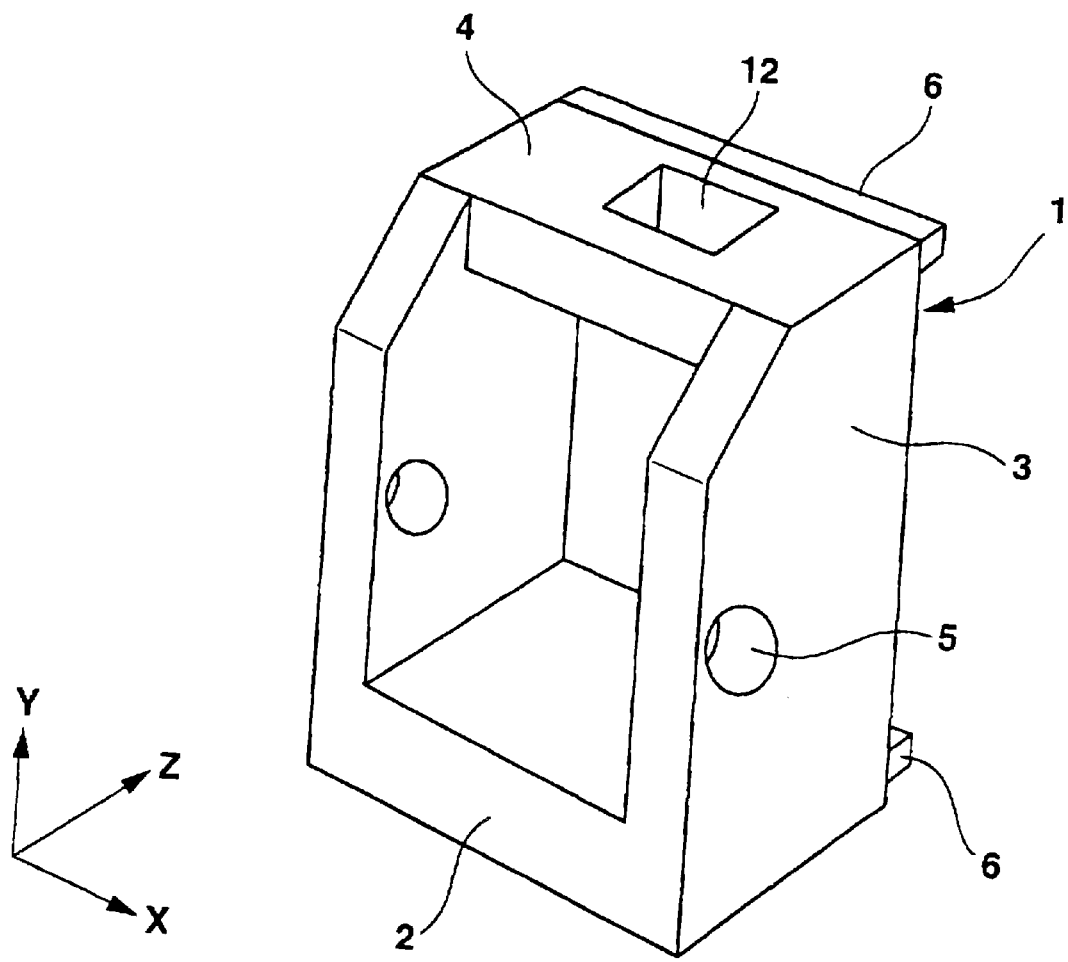
FIG. 1 shows a perspective view of a first embodiment of an inventive machine tool.

The self-contained frame 1 (FIG. 1) of a machine tool serves as workpiece support and tool support and comprises as a base a horizontal lower transverse support 2, two side walls 3 and a horizontal upper transverse support 4. A workpiece table (not shown) for workpieces to be treated is disposed to be rotatable within the frame 1 via one bearing opening 5 each in the two side walls 3.

Figure 2:
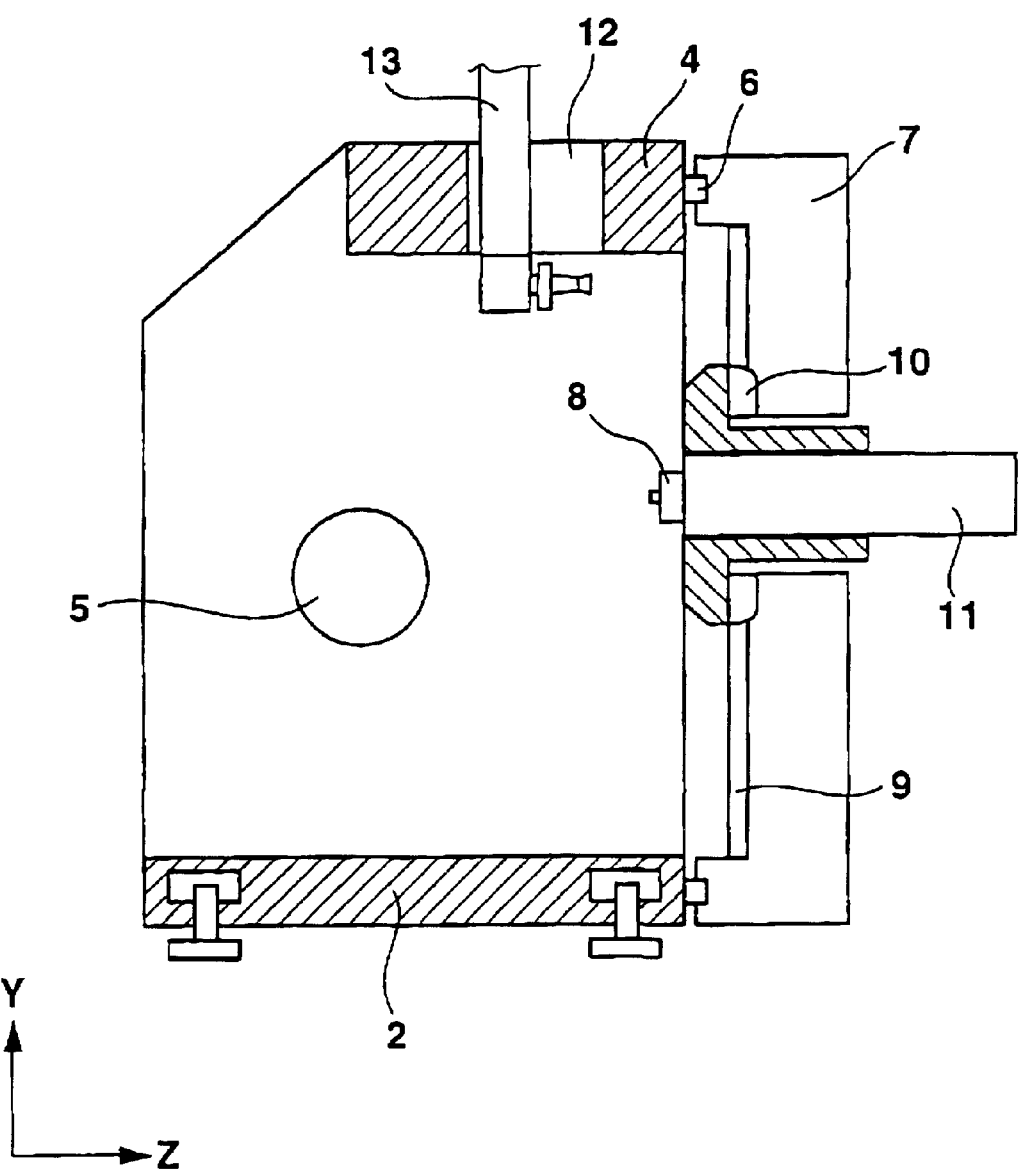
FIG. 2 shows a longitudinal section of the machine tool of FIG. 1 having work spindle and tool exchanger.

Horizontal guides 6 for an X slide 7 (FIG. 2) of a slide unit extend in each case on the rear end sides of the two transverse supports 2,4 of FIG. 1, by means of which a work spindle 8 can be moved in the X, Y and Z directions. For that purpose, the X slide 7 is provided with vertical guides 9 for a Y slide 10 in which a sleeve-like Z slide 11 can be moved in the Z direction. The upper transverse support 4 is provided with an opening 12 for passage of a tool exchanger 13 for changing the tool of the work spindle 8 from above into the inner space of the common frame 1. In the embodiment shown, the common frame 1 is a one-piece casting.

The forces acting in the Z direction during relative movement of the work spindle 8 and workpiece and in particular the forces acting during processing of the workpiece with the tool clamped in the work spindle 8, are diverted via the upper transverse support 4 onto the common side walls 3 of tool support and workpiece support and are accommodated there.

Figure 3:
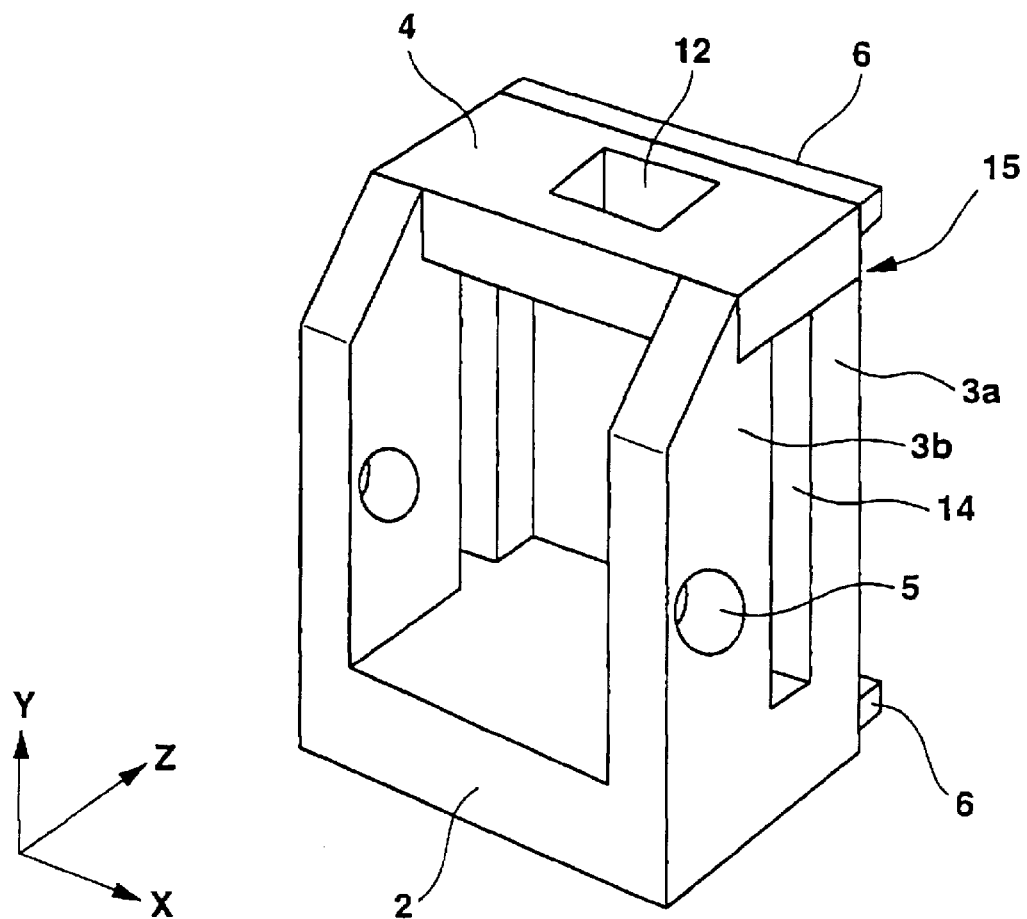
FIG. 3 shows a perspective view of a second embodiment of an inventive machine tool.

In the machine tool shown in FIG. 3, the side wall 3*a* of the tool support and the side wall 3*b* of the workpiece support are not combined into a common side wall but are separated by an opening 14. This opening 14 may be used e.g. for setting up the machine tool. If forces act between work spindle and workpiece and thereby between the two side walls 3*a*, 3*b* in the Z direction, they are diverted to and accommodated by the common upper transverse support 4 such that relative displacement between work spindle and workpiece cannot occur. In the embodiment shown, the common frame 15 consists of a separate transverse support 4 which is welded to the side walls 3*a*, 3*b* to form a stable unit.

Figure 4:
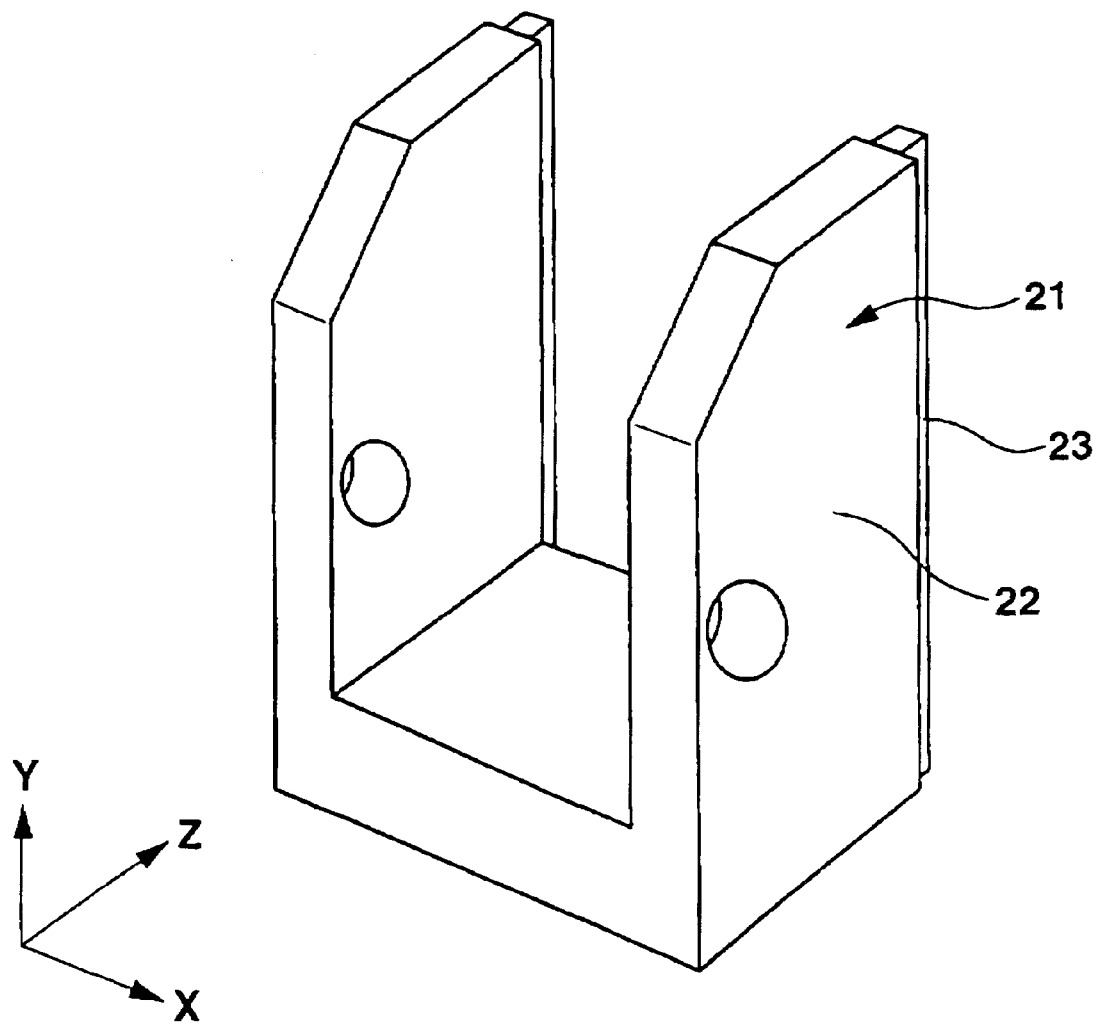
FIG. 4 shows a perspective view of a third embodiment of an inventive machine tool.
Figure 5:
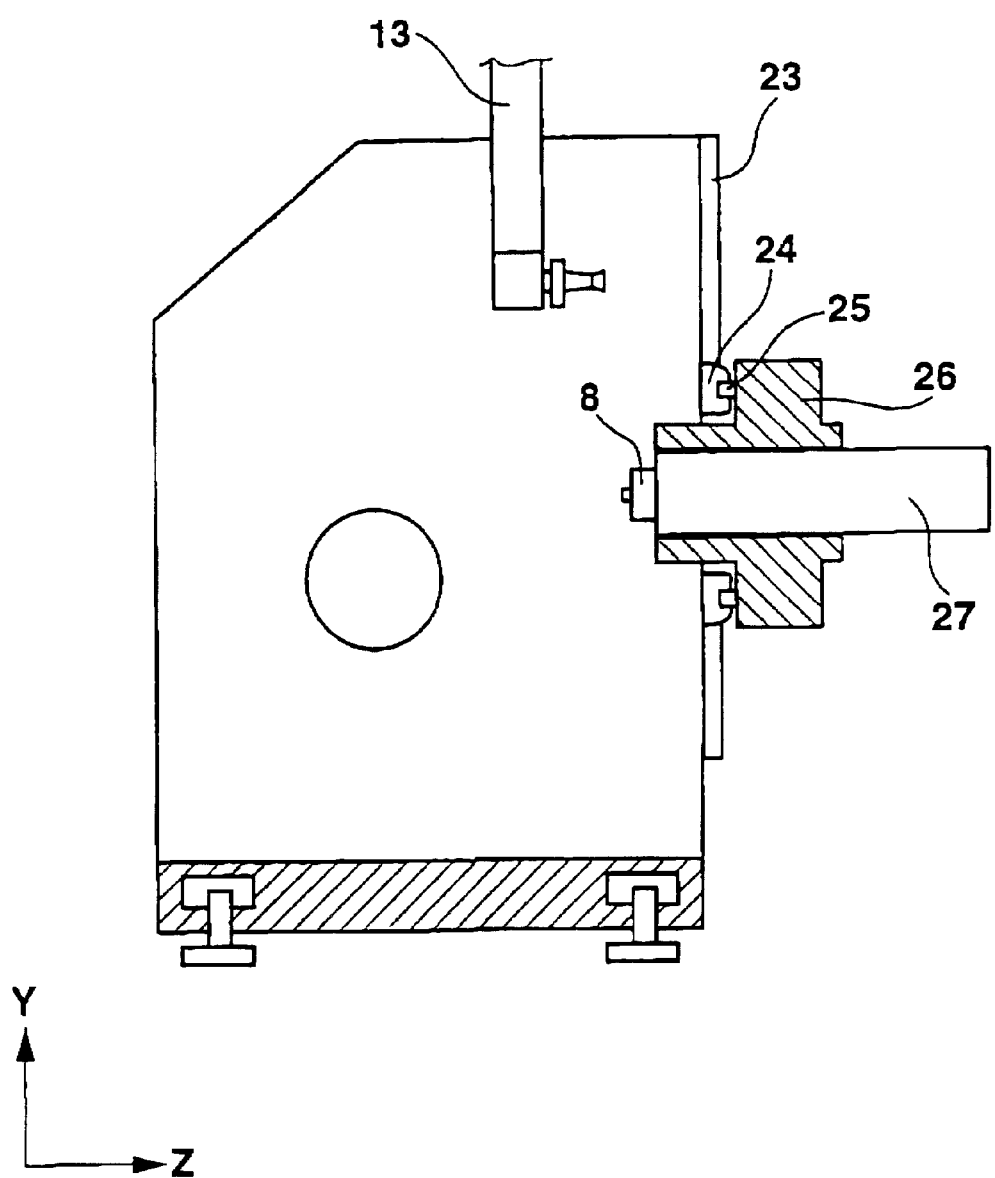
FIG. 5 shows a longitudinal section of the machine tool of FIG. 4 having work spindle and tool exchanger.

In FIG. 4, the two (common) side walls 22 of the frame 21 are not connected by an upper transverse support. Vertical guides 23 for a Y slide 24 (FIG. 5) extend, respectively, on the rear vertical end faces of the two side walls 22 of FIG. 4, and the Y slide 24 is provided with horizontal guides 25 for an X slide 26. The X slide 26 is provided with the sleeve-like Z slide 27 including work spindle 8 which is movable in the Z direction.

The machine tools shown in the figures may comprise not only one but several work spindles each.

In other words, the invention concerns a machine tool for, in particular cutting treatment of workpieces, comprising side walls carrying a rotatably disposed workpiece table for the workpieces to be processed and at least one approximately horizontally disposed processing unit (work spindle 8) wherein during operation of the machine tool, forces act between workpiece and processing unit, in particular in the Z direction, wherein the workpiece table is rotatably disposed in two opposing side walls (3;3*a*,3*b*;22) and wherein these two side walls (3;3*a*,3*b*;22) also bear the processing unit.

We claim:

1. A unit for holding a workpiece and tool to facilitate the machining of workpieces; the unit comprising:

a frame including a pair of opposed side walls and at least one upper transverse support connecting the opposed side walls;

at least one approximately horizontally disposed processing unit mounted on said at least one upper transverse support, said processing unit comprising a spindle to which said tool is mounted, said processing unit being supported on said frame between said opposing side walls; and a workpiece table rotatably supported by and positioned between said opposed side walls;

wherein during machining of a workpiece, forces act between the workpiece and the spindle of the processing unit in the axial direction of the spindle, wherein the two side walls support both the workpiece table and the processing unit.

2. The unit according to claim 1, wherein an approximately vertical guide is provided on each of the two opposing side walls; the unit including a Y-slide slidably mounted on the vertical guide; the processing unit being operatively mounted to the Y-slide.

3. The unit according to claim 1, wherein an approximately horizontal guide is provided on the upper transverse support; an X-slide slidably mounted on the horizontal guide; the processing unit being operatively mounted to the X-slide.

4. The unit according to claim 1, wherein the upper transverse support comprises an opening through which a tool exchanger can be extended to change the tool on the processing unit spindle.

5. The unit according to claim 1, including at least one lower transverse support; said lower transverse support defining a base for the two opposing side walls.

6. The unit according to claim 5, wherein the two opposing side walls, the lower transverse support and the upper transverse support are combined into a common frame.

7. The unit according to claim 6, wherein the common frame is a one-piece casting.

8. The unit according to claim 6, wherein the common frame is formed of at least two interconnected individual parts.

* * * * *

UNITED STATES PATENT AND TRADEMARK OFFICE
CERTIFICATE OF CORRECTION

PATENT NO. : 6,582,278 B1
DATED : June 24, 2003
INVENTOR(S) : Dieter Kroll and Wolfgang Armleder It is certified that error appears in the above-identified patent and that said Letters Patent is hereby corrected as shown below:

Title page, Item [54] and Column 1, lines 1 and 2,
Title, reads "MACHINE TOOL WITH HORIZONTAL WORK SPINDLE" should read -- MACHINE TOOL WITH HORIZONTALLY DISPOSED WORK SPINDLE --

Title page,
Add Item -- [73], Assignee: Schwäbische Werkzeugmaschinin GmbH, Seedorfer Strasse 91, D-78713 Schramberg-Waldmössingen (DE) --

Signed and Sealed this

Ninth Day of December, 2003

JAMES E. ROGAN
*Director of the United States Patent and Trademark Office*